United States Patent
Andreasen et al.

(10) Patent No.: US 8,059,533 B2
(45) Date of Patent: Nov. 15, 2011

(54) PACKET FLOW OPTIMIZATION (PFO) POLICY MANAGEMENT IN A COMMUNICATIONS NETWORK BY RULE NAME

(75) Inventors: Flemming Andreasen, Marlboro, NJ (US); Eric Hamel, Paris (FR); Yaacov Arbel, Raanana (IL); Meir Morgenstern, Tel-Aviv (IL)

(73) Assignee: Cisco Technology, Inc., San Jose, CA (US)

( * ) Notice: Subject to any disclaimer, the term of this patent is extended or adjusted under 35 U.S.C. 154(b) by 430 days.

(21) Appl. No.: 11/923,598

(22) Filed: Oct. 24, 2007

(65) Prior Publication Data
US 2009/0109845 A1   Apr. 30, 2009

(51) Int. Cl.
*H04L 12/28* (2006.01)
*H04J 3/22* (2006.01)
*H04W 4/00* (2009.01)

(52) U.S. Cl. .................... 370/230; 370/313; 370/469

(58) Field of Classification Search .................. None
See application file for complete search history.

(56) References Cited

U.S. PATENT DOCUMENTS

| | | | |
|---|---|---|---|
| 6,332,163 B1 | 12/2001 | Bowman-Amuah |
| 6,339,832 B1 | 1/2002 | Bowman-Amuah |
| 6,434,568 B1 | 8/2002 | Bowman-Amuah |
| 6,434,628 B1 | 8/2002 | Bowman-Amuah |
| 6,438,594 B1 | 8/2002 | Bowman-Amuah |
| 6,442,748 B1 | 8/2002 | Bowman-Amuah |
| 6,477,580 B1 | 11/2002 | Bowman-Amuah |
| 6,477,665 B1 | 11/2002 | Bowman-Amuah |
| 6,496,850 B1 | 12/2002 | Bowman-Amuah |
| 6,502,213 B1 | 12/2002 | Bowman-Amuah |
| 6,529,909 B1 | 3/2003 | Bowman-Amuah |
| 6,529,948 B1 | 3/2003 | Bowman-Amuah |
| 6,539,396 B1 | 3/2003 | Bowman-Amuah |
| 6,549,949 B1 | 4/2003 | Bowman-Amuah |

(Continued)

FOREIGN PATENT DOCUMENTS
CN    101379757    3/2009
(Continued)

OTHER PUBLICATIONS

3rd Generation Partnership Project, Policy and Charging Control over Gx reference point (Release 7), http://www.3gpp.org/ftp/Specs/archive/29_series/29.212/, Jan. 1, 2007, Publisher: 3rd Generation Partnership Project, Published in: Valbonne—France.

(Continued)

*Primary Examiner* — Jianye Wu
(74) *Attorney, Agent, or Firm* — Patent Capital Group

(57) ABSTRACT

In one embodiment, a method includes receiving packet flow optimization (PFO) configuration data that associates each rule name of multiple PFO rule names with a corresponding method for processing a data packet in a communications network based on data in a payload of a layer 3 protocol of the data packet. A first policy message is received from a policy management process in the communications network. The first policy message includes rule data that indicates a signaled rule name associated with a particular network address in the communications network. In response to receiving the first policy message, a data packet of the particular network address is processed according to a particular method associated with a particular rule name selected based on the signaled rule name. As a result, a PFO policy is controlled from the policy management process.

23 Claims, 7 Drawing Sheets

U.S. PATENT DOCUMENTS

| | | |
|---|---|---|
| 6,550,057 B1 | 4/2003 | Bowman-Amuah |
| 6,571,282 B1 | 5/2003 | Bowman-Amuah |
| 6,578,068 B1 | 6/2003 | Bowman-Amuah |
| 6,601,192 B1 | 7/2003 | Bowman-Amuah |
| 6,601,234 B1 | 7/2003 | Bowman-Amuah |
| 6,606,660 B1 | 8/2003 | Bowman-Amuah |
| 6,615,199 B1 | 9/2003 | Bowman-Amuah |
| 6,615,253 B1 | 9/2003 | Bowman-Amuah |
| 6,636,242 B2 | 10/2003 | Bowman-Amuah |
| 6,640,238 B1 | 10/2003 | Bowman-Amuah |
| 6,640,244 B1 | 10/2003 | Bowman-Amuah |
| 6,687,339 B2 | 2/2004 | Bowman-Amuah |
| 6,715,145 B1 | 3/2004 | Bowman-Amuah |
| 6,742,015 B1 | 5/2004 | Bowman-Amuah |
| 6,789,252 B1 | 9/2004 | Bowman-Amuah |
| 6,842,906 B1 | 1/2005 | Bowman-Amuah |
| 6,876,668 B1 | 4/2005 | Chawla et al. |
| 6,920,499 B2 | 7/2005 | Chen |
| 6,980,962 B1 | 12/2005 | Bowman-Amuah |
| 7,013,338 B1 | 3/2006 | Nag et al. |
| 7,020,697 B1 | 3/2006 | Goodman et al. |
| 7,123,598 B1 | 10/2006 | Chaskar |
| 2002/0062379 A1 | 5/2002 | Widegren et al. |
| 2003/0088765 A1 | 5/2003 | Eschbach et al. |
| 2004/0073928 A1 | 4/2004 | Alakoski et al. |
| 2005/0041584 A1 | 2/2005 | Lau et al. |
| 2005/0141527 A1* | 6/2005 | Gateva et al. ............... 370/401 |
| 2005/0278447 A1 | 12/2005 | Raether et al. |
| 2006/0062238 A1* | 3/2006 | Mahendran et al. ......... 370/437 |
| 2006/0193335 A1* | 8/2006 | Nanji ......................... 370/401 |
| 2006/0294219 A1* | 12/2006 | Ogawa et al. ............... 709/224 |
| 2007/0153995 A1* | 7/2007 | Fang et al. ............. 379/114.03 |
| 2007/0201665 A1 | 8/2007 | Kocan et al. |
| 2007/0226775 A1 | 9/2007 | Andreasen et al. |
| 2007/0248080 A1* | 10/2007 | Nesargi et al. ............... 370/352 |
| 2008/0013533 A1 | 1/2008 | Bogineni et al. |
| 2008/0037747 A1 | 2/2008 | Tucker |
| 2008/0104210 A1* | 5/2008 | Ramankutty ................ 709/221 |
| 2008/0108373 A1 | 5/2008 | Agarwal et al. |
| 2008/0126541 A1 | 5/2008 | Rosenberg |
| 2008/0144637 A1 | 6/2008 | Sylvain et al. |

FOREIGN PATENT DOCUMENTS

| | | |
|---|---|---|
| EP | 1982460 | 10/2008 |
| WO | WO 2007/092573 | 8/2007 |

OTHER PUBLICATIONS

3rd Generation Partnership Project 2, Service Based Bearer Control—Ty Interface Stage-3, http://www.3gpp2.org/public_html/Misc/X.P0013-014-0_VV_Due_26_March-2007.pdf, Jan. 30, 2007, Publisher: 3rd Generation Partnership Project 2, Published in: Naperville, IL US.

Cisco Systems, Inc., Supporting the IP Multimedia Subsystem for Mobile, Wireline, and Cable Providers, http://www.cisco.com/application/pdf/en/us/guest/netsol/ns549/c654/cdccont_0900aecd80395cb0.pdf, Jan. 1, 2006, Publisher: Cisco Systems, Inc., Published in: San Jose, CA US.

PCT International Search Report mailed Dec. 4, 2007 for PCT/US07/03403; 1 page.

PCT International Preliminary Report on Patentability (1 page) and Written Opinion of the International Searching Authority (7 pages) mailed Aug. 12, 2008 for PCT/US07/03403; 8 pages.

USPTO Jun. 14, 2011 Notice of Allowance from U.S. Appl. No. 11-671,861.

USPTO Jun. 14, 2011 Notice of Allowance from U.S. Appl. No. 11/671,861.

* cited by examiner

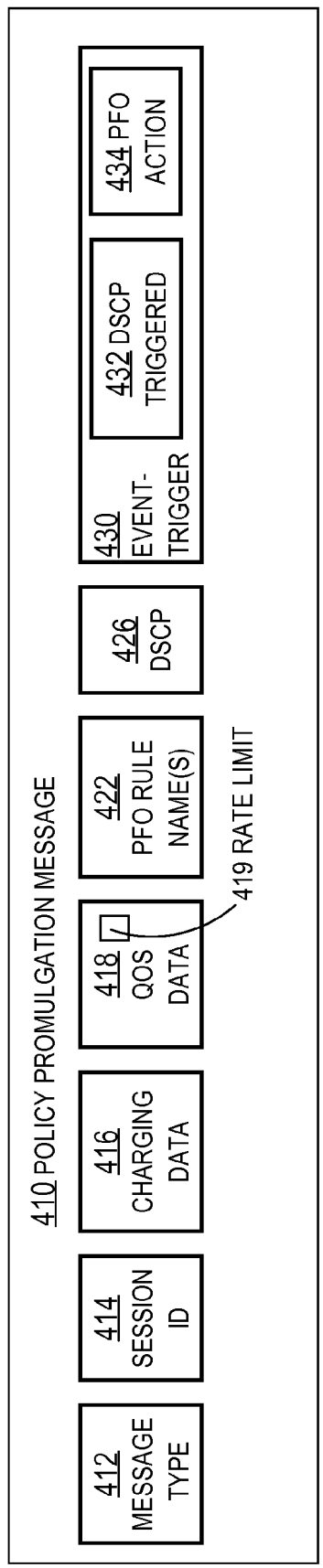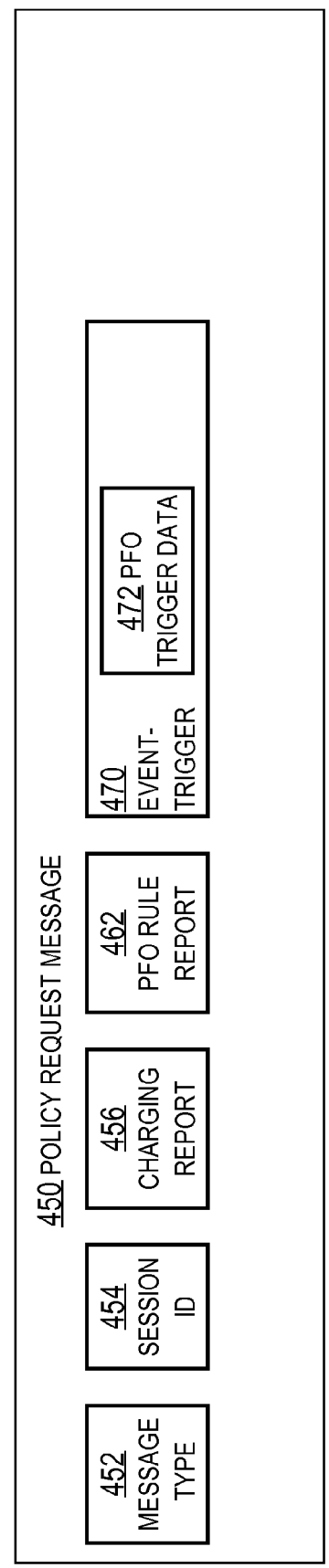

PACKET FLOW OPTIMIZATION (PFO) POLICY MANAGEMENT IN A COMMUNICATIONS NETWORK BY RULE NAME

BACKGROUND

1. Technical Field

The present disclosure relates generally to packet forwarding in a communications network, such as packet flow optimization also known as deep packet inspection.

2. Background

Networks of general-purpose computer systems and other devices connected by external communication links are well known. A network node is a device or computer system connected by the communication links. As used herein, an end node is a network node that is configured to originate or terminate communications over the network. In contrast, an intermediate network node facilitates the passage of data between end nodes. Information is exchanged between network nodes according to one or more of many well known, new or still developing protocols. In this context, a protocol consists of a set of rules defining how the nodes interact with each other based on information sent over the communication links.

Subscribers often obtain access to a network of a Service Provider (SP) through a node acting as an access gateway (AG). Once the subscriber is authenticated, data flows from the subscriber are subject to control by the SP at the AG based on a subscriber profile in a network policy manager. Many current network policy managers exchange messages with the AG to pass information about charging the subscriber for data packet traffic and providing a particular quality of service (a particular combination of guaranteed communications properties, such as bandwidth, noise, jitter, and delay) using a protocol called the Ty Interface. The Ty interface specification is available from the $3^{rd}$ generation Partnership Project 2 (3GPP2) at World Wide Web domain 3gpp.org. Current policy managers in general, and the Ty interface in particular, do not provide information on packet flow optimization (PFO), by which data packets are forwarded at the AG based on information within a payload of a routed protocol, such as the Internet Protocol (IP).

BRIEF DESCRIPTION OF THE DRAWINGS

The present disclosure is illustrated by way of example, and not by way of limitation, in the figures of the accompanying drawings and in which like reference numerals refer to similar elements and in which:

FIG. 4A illustrates an example policy promulgation message sent from a policy manager;

FIG. 4B illustrates an example policy request message sent from a policy enforcement process;

DESCRIPTION OF EXAMPLE EMBODIMENTS

Figure 1:
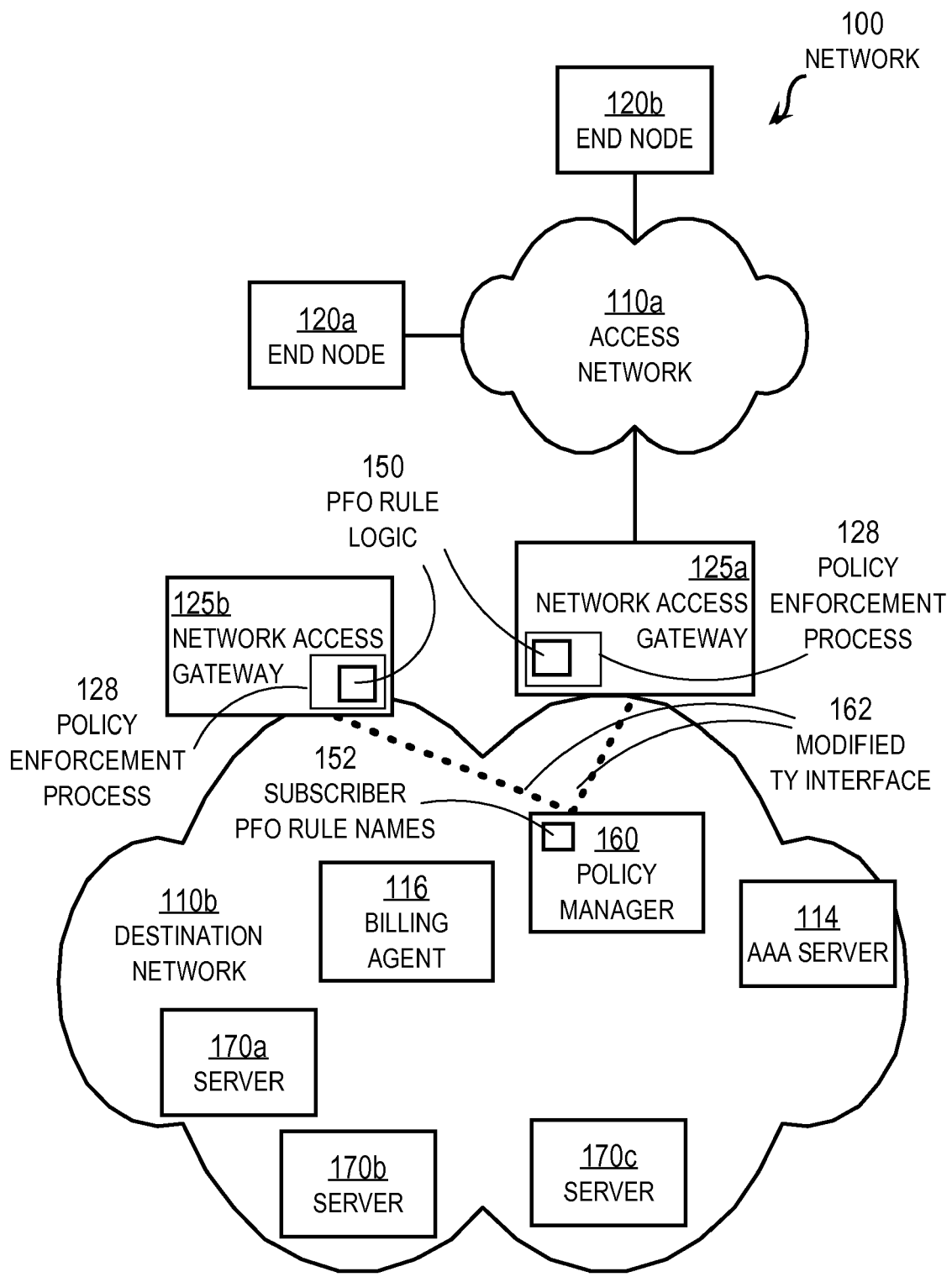
FIG. 1 illustrates an example network with PFO policy at an access gateway managed by a separate policy manager.

Techniques are described for packet flow optimization policy enforcement. In the following description, for the purposes of explanation, numerous specific details are set forth in order to provide a thorough understanding of the present disclosure. It will be apparent, however, to one skilled in the art that embodiments may be practiced without these specific details. In other instances, well-known structures and devices are shown in block diagram form in order to avoid unnecessarily obscuring the present disclosure.

Some embodiments are described in the context of using a modified Ty interface protocol for messages between a policy management process (also called herein a policy manager) on one node in a communications network and a policy enforcement process (also called herein a policy enforcer) on a different node that serves as an access gateway. However, the invention is not limited to this context, and may be used with any protocol for exchanging messages between a PFO policy manager and a separate PFO policy enforcer located on one or more other nodes in a communications network. In some embodiments, the same policy manager manages other policies, such as quality of service (QoS) and charging, as well as PFO. Similarly, in some embodiments, the same policy enforcer enforces other policies, such as quality of service (QoS) and charging, as well as PFO. In these embodiments, the PFO policy manger and PFO policy enforcer are part of the general policy manger process and general policy enforcer process. In some embodiments the Ty or Gx interface for the 3GPP environment is modified to provide the protocol for exchanging PFO policy messages. In some embodiments the policy enforcement process is on a different node than an access gateway node. For example, in an Advances to Internet Protocol (IP) Multimedia Subsystem (A-IMS), the subscriber profile is applied at a Bearer Manager (Home Agent) process on a node that is not the access gateway node.

1.0 Overview

In one set of embodiments, a method includes receiving packet flow optimization (PFO) configuration data that associates each user identifier of a plurality of user identifiers with a corresponding rule name of a plurality of PFO rule names. A particular user identifier of the multiple user identifiers is associated with a particular network address in the communications network. A first policy message is sent to a policy enforcement process in the communications network. The first policy message includes, in association with the particular network address, rule data that indicates a signaled rule name associated with the particular user identifier. The policy enforcement process is operable for processing a data packet of the particular network address based on data in a payload of an internetwork protocol of the data packet according to a particular method associated with a particular rule name. The particular rule name is selected based on the signaled rule name. As a result, a PFO policy is controlled at the policy enforcement process.

In another set of embodiments, a method includes receiving packet flow optimization (PFO) configuration data that associates each rule name of multiple PFO rule names with a corresponding method for processing a data packet in a communications network based on data in a payload of an internetwork protocol of the data packet. A first policy message is received from a policy management process in the communications network. The first policy message includes rule data that indicates a signaled rule name of the multiple PFO rule names associated with a particular network address in the communications network. In response to receiving the first policy message, a data packet of the particular network address is processed according to a particular method associated with a particular rule name selected based on the signaled rule name. As a result, a PFO policy is controlled from the policy management process.

In other embodiments, an apparatus, a system or logic encoded in one or more tangible media, or instructions encoded on one or more computer-readable media, is operable to perform one or more steps of the above methods.

2.0 Network Overview

The protocols used for communication over a network are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model. The OSI Reference Model is generally described in more detail in Section 1.1 of the reference book entitled *Interconnections Second Edition*, by Radia Perlman, published September 1999.

Communications between nodes are typically effected by exchanging discrete packets of data. Each packet typically comprises 1] header information associated with a particular protocol, and 2] payload information that follows the header information and contains information that may be processed independently of that particular protocol. In some protocols, the packet includes 3] trailer information following the payload and indicating the end of the payload information. The header includes information used by the protocol. Often, the data in the payload for the particular protocol includes a header and payload for a different protocol associated with a different, typically higher layer of the OSI Reference Model. The protocol in the payload is said to be encapsulated in the protocol of the header. The headers included in a packet traversing multiple heterogeneous networks, such as the Internet, typically include a physical (layer 1) header, a datalink (layer 2) header, an internetwork (layer 3) header, and some combination of a transport (layer 4) header, a session (layer 5) header, a presentation (layer 6) header and an application (layer 7) header as defined by the Open Systems Interconnection (OSI) Reference Model.

When a user at a node having a particular network address attempts access to the network of the SP, an authentication process on the network access gateway (AG) node determines whether the user is in fact a subscriber authorized to access the network. The authentication process exchanges packets with an Authentication, Authorization, and Accounting (AAA) server using an AAA protocol. Example well-known AAA servers include the Remote Authentication Dial In User Service (RADIUS) server, Terminal Access Controller Access Control System (TACACS), and the Diameter server. Once the entity is authenticated to be an authorized subscriber in good accounts, then access is granted to the network.

A modern SP can offer different services to different subscribers, including services delivered in protocol layers 4 through 7. Such services include email, multimedia conferencing, age appropriate protections, web page translation for small displays devices such as cell phones, gaming, and voice services including telephony, caller identification (ID), call forwarding and voice mail. New services are constantly being developed. Some services require more network resources than others, such as higher bandwidth, less delay and less variability in travel time, a combination of which constitutes a measure of quality of service (QoS). Some subscribers are charged more for certain services or a particular quality of service, or both. Many services involve routing data packets to particular nodes in the network with special processes that provide or support the service. To provide such services efficiently, a gateway node performs packet flow optimization (PFO) in which the payload of the layer 3 protocol (i.e., the internetwork protocol, such as the Internet Protocol, IP) is inspected to determine the service involved, and the data packet is affected or routed to a particular process involved in the service on a particular node. Normal routing involves routing based only on a destination network address in a layer 3 header. In some embodiments, other network elements in the network, such as a Session Border Controller (SBC) appliance from Cisco Systems, Inc. of San Jose, Calif., support PFO.

For data from the subscriber, fewer network resources are consumed if charging, quality of service and PFO are enforced at an access point, such as a network access gateway, where the user's data packets enter the network. For data directed to the subscriber, other nodes in the network are natural for enforcing these policies. However, there are so many such entry points, that configuring them all with user specific policy data is difficult and expensive. Furthermore, in modern communications networks, a user may use a mobile end node that approaches a network from any of multiple different entry points, which makes configuring user specific data, even for a single user, difficult.

Policy manager processes on a node in a network provide a central point for configuring multiple access gateway nodes to the network for subscriber specific services. However, currently standardized policy manager interfaces provide only subscriber specific charging and quality of service configuration data, not PFO information.

Applicants have devised a standards-based method and system for efficiently providing PFO information from a policy manager to multiple policy enforcers, such as enforcers on network access gateway nodes.

FIG. 1 illustrates an example network 100 with PFO policy at an access gateway AG managed by a separate policy management process (a policy manager, PM). Network 100 includes end nodes (e.g., end nodes 120a, 120b, collectively referenced hereinafter as end nodes 120) that communicate with one another, typically through one or more intermediate network nodes, such as a router or switch, that facilitates forwarding data between end nodes 120 on the same or different sub-networks. Network 100 includes two sub-networks (e.g., access network 110a, and destination network 110b, collectively referenced hereinafter as sub-networks 110) that are typically involved in remote access. Each sub-network 110 may include zero or more intermediate network nodes. A destination network 110b, such as an Internet Protocol (IP) packet-switched network, is the target for remote access by users of end nodes 120a, 120b at one or more remote sites. The remote sites are connected to the destination network 110b through an access network 110a. Network 100 includes network access gateway (AG) node 125a and AG node 125b, among others, not shown, collectively referenced hereinafter as AG nodes 125. Access network 110a is connected to destination network through AG node 125a.

In various embodiments, access network 110a is built, at least in part, on a telephone twisted pair, coaxial copper, optical cable, or a wireless infrastructure, including cell phone infrastructure, or some combination. In various embodiments, access network 110a includes a controller for a bank of low-bandwidth modems, a digital subscription line (DSL) access module (DSLAM), a mobile base station, or other coaxial cable or optical access modules. Although two end nodes 120a, 120b are depicted connected to access network 110a for purposes of illustration, in other embodiments more or fewer end nodes are connected to access network 110a. For mobile devices, the access network 110a includes circuitry and logic to maintain communication as the mobile device moves from one wireless access point (e.g., a mobile telephone cell antenna) to another.

Communications over access network 110a from end nodes 120a, 120b terminate at AG node 125a. Other end nodes using other access networks terminate at other AG node 125, such as AG node 125b. Although two AG nodes 125a, 125b are depicted connected to destination network 110b, in other embodiments more or fewer AG nodes are connected to destination network 110b. In various embodiments the AG node includes a Broadband Remote Access Server (BRAS), a wireless access server, or some other server. Other examples of such AG include Packet Data Serving Node (PDSN) in 3GPP2, Gateway GPRS Support Node (GGSN) in 3GPP, Access Service Network Gateway (ASNGW) for WiMAX, IP Gateway (IPGW) in general, and Home Agents.

The client-server model of computer process interaction is widely known and used in commerce. According to the client-server model, a client process sends a message including a request to a server process, and the server process responds by providing a service. The server process may also return a message with a response to the client process. Often the client process and server process execute on different computer or other communicating devices or network nodes, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host nodes, unless otherwise clear from the context. In addition, the process performed by a server can be broken up to run as multiple servers on multiple hosts (sometimes called tiers) for reasons that include reliability, scalability, and redundancy, but not limited to those reasons.

Destination network 110b is used by end nodes 120a, 120b at remote sites to communicate with servers, such as servers 170a, 170b, 170c (collectively referenced hereinafter as servers 170). Servers 170 provide such services as email, telephony, voice mail, Web page translation, among others. Destination network 110b includes an AAA server 114, a billing agent process 116 and a policy manager 160.

AAA server 114 is used to authenticate the user of end nodes 120 attempting to access network 100 through any AG node 125. Only a subscriber registered with the SP and listed in the AAA server 114 is given access to network 100. Network 100 also includes billing agent server 116, to collect information about use of network 110b by a particular subscriber for purposes of obtaining payment from that subscriber. A subscriber that is in bad accounts, may be marked unauthorized or removed from the AAA server 114.

In an illustrated embodiment, billing agent 116 determines when and whether a subscriber is to be listed with the AAA server 114 based on payments received from a subscriber. The billing agent 116 also determines how a particular subscriber is to be charged for traffic of various types. An example billing agent server is a Billing Mediation Agent (BMA). In some embodiments, a separate billing agent 116 is omitted and the functions ascribed thereto are distributed among other servers, such as policy manager 160 or AAA server 114.

To provide subscriber-aware services, 100 includes policy manager 160. In some embodiments, policy manager 160 includes a cluster of multiple nodes and load balancers (not shown). Although one policy manager 160 is shown in FIG. 1 for purposes of illustration, in other embodiments network 100 includes more policy managers 160. Policy manager 160 sends policy information to AG nodes 125 to be enforced against traffic communicated with subscribers using end nodes 120 on access networks such as access network 110a. The policy information for billing and QOS is communicated to a policy enforcement process (PEP, also called a policy enforcer) 128 on an AG node 125 using the Ty interface protocol.

According to an illustrated embodiment, a modified Ty interface protocol 162, indicated by the dashed communication path in FIG. 1, is used to pass PFO policy information to the PEP 128. In this embodiment, the policy manager 160 includes PFO rule names associated with each subscriber in a subscriber PFO rule names data structure 152, and each PEP 128 includes PFO rule logic 150 associated with each rule name. In other embodiments, another protocol is used, e.g., a Gx interface protocol is modified.

A PFO rule is a process for forwarding a flow of data packets. A flow of data packets is a series of one or more data packets within a session with a particular user from the same source process on a source node in the network to the same destination process on a destination node in the network. The source and destination processes are typically identified based on some combination of their layer 3 source and destination network addresses, their layer 4 (transport) protocol, and their layer 4 source and destination port numbers. Different transport protocol port numbers allow different processes on the same node to use the same network communication link. In some embodiments, a range of layer 3 addresses are indicted by a wildcard notation. In some embodiments, layer 5 and higher protocol fields are included to identify a particular flow.

For example, it is assumed for purposes of illustration that a rule is to determine if a particular flow is Web page traffic using the layer 7 Hyper-Text Transfer Protocol (HTTP), and if so, to pass that flow through a filter for an under 18 year old subscriber, ensuring that inappropriate content is not passed to this user. This rule is given a name, such as Under18Web. The logic to enforce this rule is stored in PFO rule logic 150 in association with the rule name Under18Web on each PEP 128. The rule name Under18Web is stored in subscriber PFO rule names data structure 152 on policy manager 160 in association with a particular subscriber, identified by a particular user identifier (ID), e.g., jane123@ispxyz.com. When jane123@ispxyz.com uses end node 120b with IP address 111.222.33.2 to access network 110b and is authorized at AAA server 114 as a current subscriber, then policy manager 160 uses modified Ty interface 162 to send PFO policy data for traffic of IP address 111.222.33.2 that includes PFO rule Under18Web as well as the billing policy and QOS policy for the subscriber with user IDjane123@ispxyz.com. The PFO rule logic 150 in PEP 128 on AG node 125a subjects Web traffic to or from (or both) IP address 111.222.33.4 to the filter for an under 18 year old subscriber.

3.0 PFO Policy Structures

In an illustrated embodiment, processes included in a policy manager 160 provide PFO policy management and use one or more data structures modified from those used by current policy managers. Similarly, processes included in a PEP 128 provide PFO policy enforcement and use one or more modified data structures from those used by current PEP.

Figure 2:
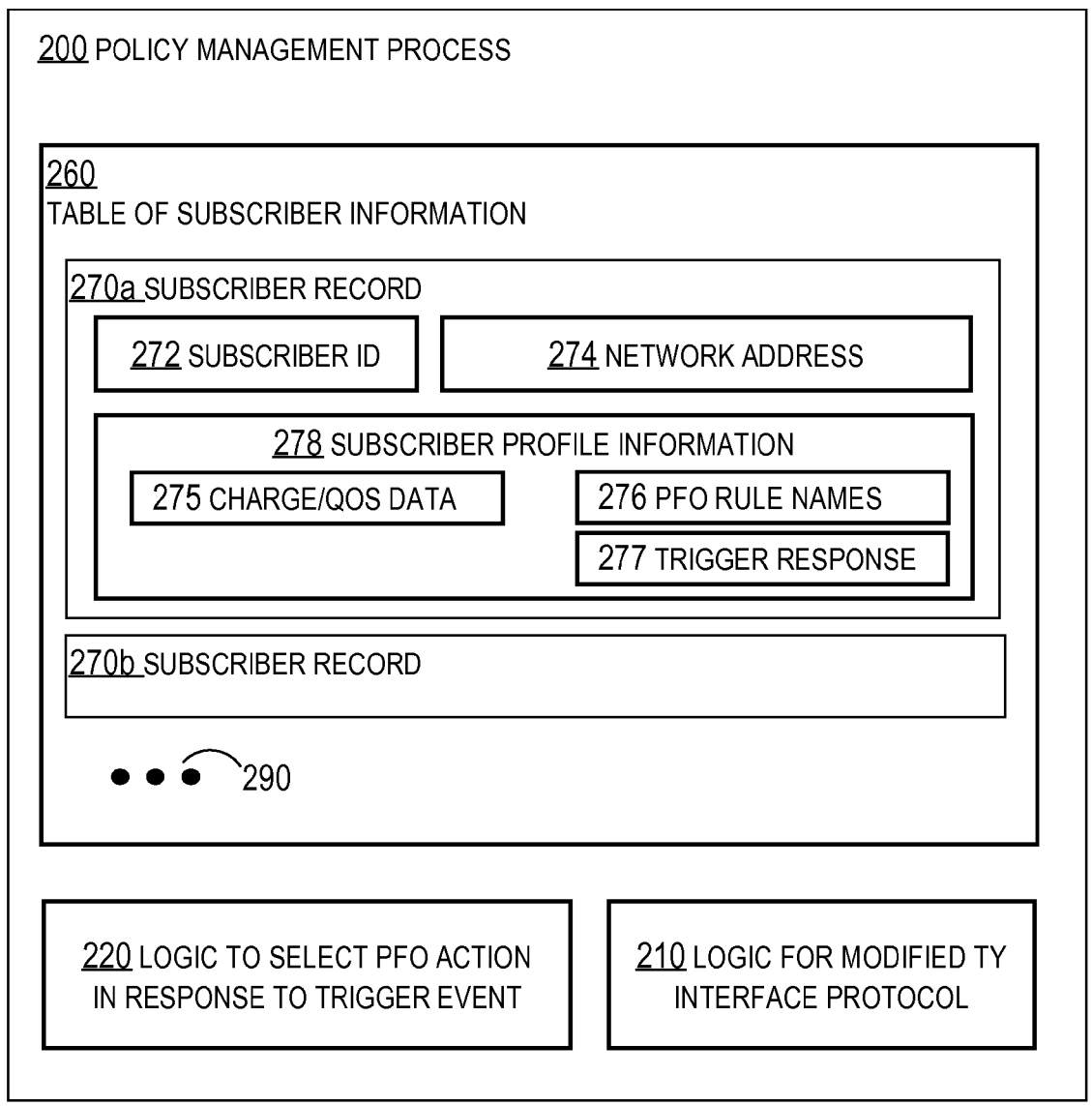
FIG. 2 illustrates example structures included in an example policy management process.

FIG. 2 illustrates example structures included in an example policy management process 200. Policy management process 200 is one embodiment of policy manager 160. Policy management process 200 includes a data structure called a table 260 of subscriber information, logic 220 to select PFO action in response to a trigger condition, and logic 210 for a modified Ty interface protocol. In some embodiments, logic 220 and logic 210 are instructions for a general purpose processor. In some embodiments, one or both are logic encoded in special purpose circuitry.

The table 260 includes a subscriber record for each subscriber, including subscriber record 270*a*, subscriber record 270*b* and others indicated by ellipsis 290, collectively referenced hereinafter as subscriber records 270. Each subscriber record 270 includes a subscriber ID field 272, a network address field 274, and subscriber profile information field 278. Subscriber profile information field 278 includes charge/QOS data field 275, a PFO rule names field 276, and a trigger response field 277.

Although fields and data structures in FIG. 2 and subsequent figures are shown as contiguous blocks of data in a particular order in a single portion of memory for purposes of illustration, in other embodiments one or more fields or data structures or portions thereof occur in a different order or in different portions of one or more memory devices on or available to the node where the process is executed, such as in linked lists, relational databases and other well known data structures.

Subscriber ID field 272 holds data that uniquely indicates a subscriber among all subscribers for a particular service provider (SP). For example, jane123@ispxyz.com, uniquely identifies a particular subscriber of an SP named ISPXYZ.

Network address field 274 holds data that indicates a network address of an end node on which the subscriber has attempted access to the SP network. The contents of field 274 are determined dynamically when a subscriber logs on to the network, for example during the authentication process. In some embodiments, the policy management process 200 is directly involved during the authentication process and obtains the network address itself. In some embodiments, the policy management process 200 is not directly involved during the authentication process and obtains the network address in a message from another process or node, such as when a request message is received for a policy for a particular user. In some of these embodiments, field 274 is omitted. For example, when jane123@ispxyz.com logs on to the network at end node 120*b* with IP address 111.222.33.2, network address field 274 holds data that indicates IP address 111.222.33.2.

Charge/QOS data field 275 holds data that indicates charging and QOS policy information, such as whether the subscriber pays a flat fee for all services or is charged per unit of traffic of one or more traffic types (e.g., depending on the layer 7 protocol) and whether the subscriber has paid for a basic or enhanced level of quality of service (e.g., bronze, silver or gold levels of quality of service). In some embodiments, a differentiated services code point (DSCP) value is used to indicate a more particular level of quality of service. DSCP is described in more detail in a document of the Internet Engineering Task Force (IETF) called request for comments (RFC) 2474. RFC 2474 and other numbered RFC are available at the time of this writing at World Wide Web domain ietf.org.

PFO rule names field 276 holds data that indicates the PFO rule or group of rules that are to be applied to traffic from the subscriber indicated in field 272. In some embodiments, multiple PFO rules apply to the same subscriber. For example, it is assumed for purposes of illustration that the subscriber has paid for gaming services as well as Web services. As a result, a PFO rule named Under18game also applies to this subscriber. In some embodiments, both the Under18Web name and the Under18game name are indicated by data included in PFO rule names field 276. In some embodiments, group names are defined that indicate multiple PFO rule names. For example, it is assumed for purposes of illustration that a group name Under18 is defined that includes both Under18Web and Under18game.

It is further assumed for purposes of illustration that the subscriber has paid for voice over IP (VoIP) services as well as Web services. As a result, a PFO rule named VoIP also applies to this subscriber.

In some embodiments, PFO rule names field 276 includes data that indicates certain PFO rules that are not to be applied to the subscriber. For example, a subscriber ages up, and the under18group of rules no longer apply to that subscriber. It is further assumed for purposes of illustration that the subscriber has not paid for instant messaging (IM) and so is allowed IM only at low usage times (e.g., after 8 PM at the user's location). As a result, a PFO rule named IM applies to this subscriber only from 8 PM to 6 AM and does not apply from 6 AM to 8 PM.

Trigger response field 277 holds data that indicates a response to dynamic conditions detected at the PEP by one of the named rules. For example, field 277 holds data that indicates how to treat this subscriber in the event of an emergency or unusual congestion in the network or a particular type of flow detected by logic associated with one of the rules named in field 276. For example, trigger response field 277 holds data that indicates one of the following actions: 1] drop; 2] pass; 3] remark to a different DSCP value; 4] rate-limit drop, by which packets of a flow are dropped if a certain rate associated with the subscriber's quality of service is exceeded; and 5] rate-limit remark, by which packets of a flow are remarked to a different DSCP value if a certain data rate associated with the subscriber's service is exceeded. In some embodiments, the trigger response field 277 holds data that associates one of these actions with each of multiple flow types for the particular user, e.g., with certain applications. For example, it is assumed for purposes of illustration that a data flow for internet telephone application at server 170*a* that pays the SP a premium will be associated with rate-limit remark action but a data flow for internet telephone application with no server provided by the SP, (e.g. Skype) that does not pay a premium to the SP will be associated with a rate-limit drop action.

The logic 220 to select a PFO action in response to a trigger event, when executed, causes the policy management process 200 to determine an action, such as the actions listed above with reference to field 277, based on the event that is triggered. In some embodiments, the action is subscriber-independent. For example, all voce traffic is handled the same way, e.g., remarked to a particular DSCP value. In some embodiments, the action is subscriber-dependent; and the logic 220 reads the data in the trigger response field 277 to determine the action.

The logic 210 for the modified Ty interface protocol, when executed, causes the policy management process 200 to send, receive and process messages formatted according to a Ty protocol modified as described below with reference to FIG. 4A and FIG. 4B.

Figure 3:
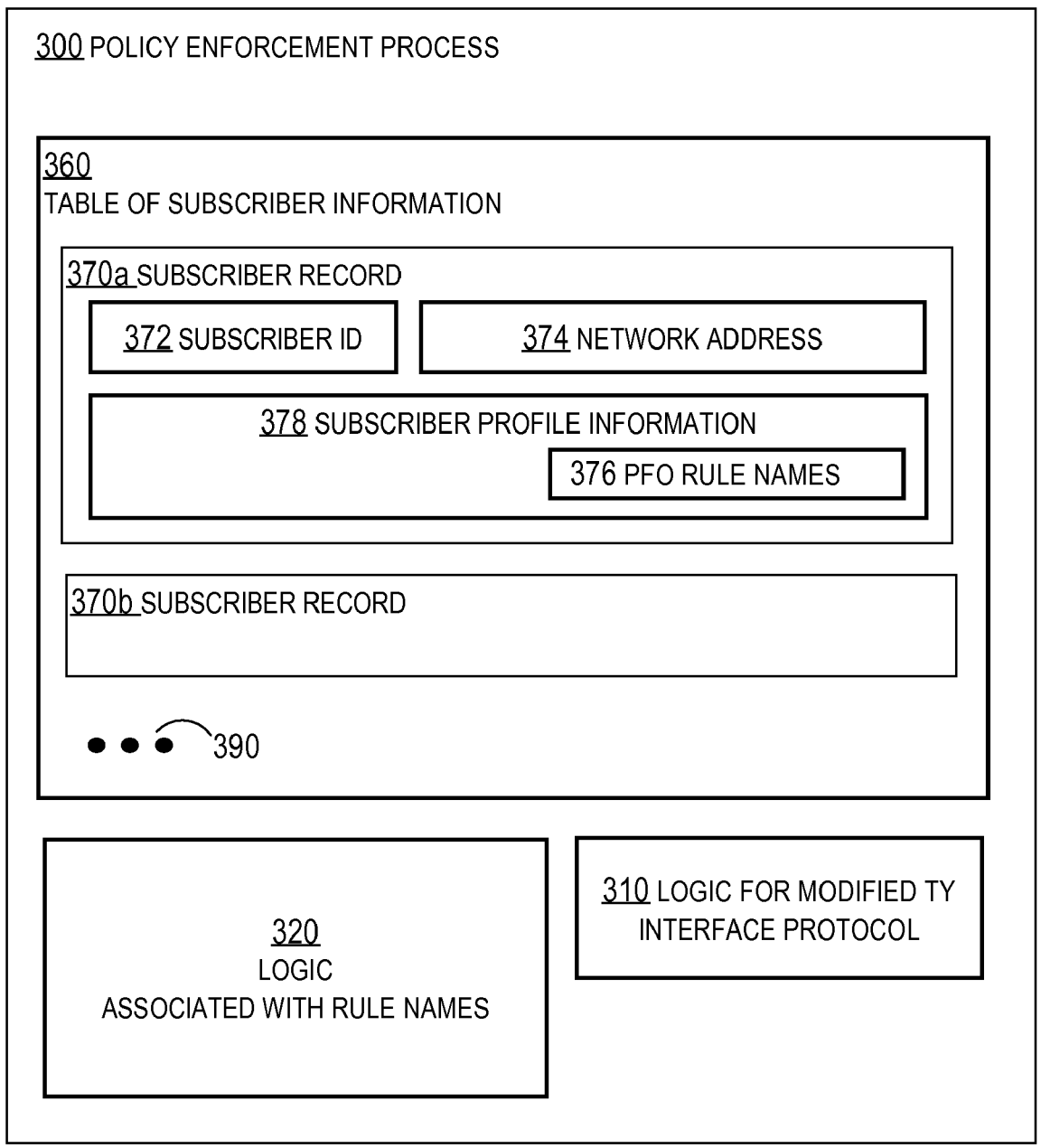
FIG. 3 illustrates example structures included in an example policy enforcement process on an access gateway.

FIG. 3 illustrates example structures included in an example policy enforcement process 300. Policy enforcement process 300 is one embodiment of PEP 128. Policy enforcement process 300 includes a data structure called a table 360 of subscriber information, logic 320 associated with rule names, and logic 310 for a modified Ty interface protocol. In some embodiments, logic 320 and logic 310 are instructions for a general purpose processor. In some embodiments, one or both are logic encoded in special purpose circuitry.

The table 360 includes a subscriber record for each subscriber who has gained access, or is in the process of gaining access, to network 100 on the local AG node (e.g., AG node 125a), including subscriber record 370a, subscriber record 370b and others indicated by ellipsis 390, collectively referenced hereinafter as subscriber records 370. Each subscriber record 370 includes a subscriber ID field 372, a network address field 374, and subscriber profile information field 378. Subscriber profile information field 378 includes a PFO rule names field 376.

Subscriber ID field 372 holds data that uniquely indicates a subscriber among all subscribers for the particular service provider (SP), such as jane123@ispxyz.com.

Network address field 374 holds data that indicates a network address of an end node on which the subscriber has attempted access to the SP network. The contents of field 374 are determined dynamically when a subscriber logs on to the network, for example during the authentication process. In some embodiments, the policy enforcement process 300 is directly involved during the authentication process and obtains the network address itself. In some embodiments, the policy enforcement process 300 is not directly involved during the authentication process and obtains the network address from an authentication process executing on the AG node 125 or on some other node. For example, when jane123@ispxyz.com logs on to the network at end node 120b with IP address 111.222.33.2, network address field 374 holds data that indicates IP address 111.222.33.2.

PFO rule names field 376 holds data that indicates the PFO rule or group of rules that are to be applied to traffic to or from the subscriber indicated in field 372, or both. In some embodiments, group names are included in PFO rule names field 376.

The logic 320 associated with rule names includes logic to process data flows for each rule name. When a data packet is received for network address indicated in network address field 374, e.g., in subscriber record 370a, the data packet is processed according to the logic in logic 320 associated with rule names indicated in the PFO rule names field 376 in subscriber record 370a.

The logic 310 for the Ty interface protocol, when executed, causes the policy enforcement process 300 to send, receive and process messages formatted according to a Ty protocol modified as described below with reference to FIG. 4A and FIG. 4B.

FIG. 4A illustrates an example policy promulgation message 410 sent from a policy manager. In illustrated embodiments, the policy promulgation message 410 is a modified Ty interface message, such as a modified unsolicited Re-Auth-Request (RAR) Command or a modified solicited Credit Control-Answer (CCA) Command.

Message 410 includes a message type field 412, a session identifier (ID) field 414, a charging data field 416, a QOS data field 418, a PFO rule name(s) field 422, a DSCP field 426 and an optional event-trigger field 430.

Although fields in messages in FIG. 4A and subsequent figures are shown as contiguous blocks of data in a particular order in a single data packet for purposes of illustration, in other embodiments one or more fields or portions thereof occur in a different order or in different portions of one or more data packets.

The message type field 412 holds data that indicates that the message 410 is a policy promulgation message. For example, in embodiments using a modified Ty interface for a Diameter Protocol, the message type field includes data that indicates a CCA or a RARt followed by other Diameter header fields.

The session ID field 414 holds data that uniquely indicates the session to which the policy applies. A session is all traffic associated with a single successful user authentication process and applies to all traffic to or from a particular IP address beginning when a subscriber is successfully authenticated and authorized at an AAA server and ends when traffic from that IP addresses ceases for a particular duration of time or the subscriber affirmatively logs off. After authentication, the session ID is associated with a particular subscriber ID and particular IP address. The session ID field 414 includes data that indicates the subscriber ID and the particular IP address. In embodiments using a modified Ty interface for a Diameter Protocol, the session ID field 414 includes a Ty-Diameter Session ID field and an Auth-Application-Id field in the conventional Ty specification. A Diameter session is associated with a single user session and can apply session policy to all traffic to or from a particular IP address beginning when a subscriber is successfully authenticated and authorized at an AAA server and ends when traffic from that IP address ceases for a particular duration of time or the subscriber affirmatively logs off The charging data field 416 holds data that indicates the charging policy for the subscriber associated with the current session ID in field 414. In embodiments using a modified Ty interface for a Diameter Protocol, the charging data field 416 includes one or more of Charging-Rule-Remove field, a Charging-Rule-Install field and a Charging-Information field in the conventional Ty specification.

The QOS data field 418 holds data that indicates the quality of service policy for the subscriber associated with the current session ID in field 414. In embodiments using a modified Ty interface for a Diameter Protocol, the QOS data field 418 includes an Authorized-QOS field in the conventional Ty specification. The authorized QOS field includes a rate limit field 419. The rate limit field 419 holds data that indicates a limit to the amount of data per unit of time (e.g., bits per second, bps) that the subscriber, indicated in field 414, is authorized to use. If specified along with some flow definition, the rate limit applies per flow; if not, the rate limits is the overall the limit for the session.

The PFO rule names field 422 holds data that indicates the names of PFO rules to install or remove for this session. One or more rule names or rule group names are included in the data in field 422. In embodiments using a modified Ty interface for a Diameter Protocol, the PFO rule names field 422 includes one or more PFO-Rule-Install attribute-value pair (AVP) added to the conventional Ty specification and a PFO-Rule-Remove AVP added to the conventional Ty specification.

In an illustrated embodiment, a code designated herein by the symbols "aaa" is added to the Ty specification to indicate a PFO-Rule-Name AVP. The AVP is of type Octet/String and includes a string of characters that uniquely specify a name of a PFO rule (e.g., Under18Web). In some embodiments, a PFO-Rule-Base-Name is also added to the Ty specification. In an illustrated embodiment, a code designated herein by the symbols "bbb" is added to the Ty specification to indicate a PFO-Rule-Base-Name AVP. The PFO-Rule-Base-Name AVP is also of type Octet/String and includes a string of characters that uniquely specify a name of a group of PFO rules (e.g., Under18).

In an illustrated embodiment, a code designated herein by the symbols "ccc" is added to the Ty specification to indicate the PFO-Rule-Install AVP. The PFO-Rule-Install AVP is type "Group" and includes the code "ccc" in the AVP header. The AVP group includes one of more AVPs. At least one of the included AVP is a PFO-Rule-Name AVP or a PFO-Rule-Base-Name AVP. The PFO-Rule-Install AVP format can be stated by code of the ABNF format, specified in RFC 4234, available at World Wide Web domain ietf.org:

```
PFO-Rule-Install   ::= <AVP Header: ccc >
                       *[ PFO-Rule-Name ]
                       *[ PFO-Rule-Base-Name ]
                       *[ AVP ]
``` where
::=means that the name on the left side is defined by the production on the right side;
< > indicates a grouping for readability;
* means zero, one or more; and
[ ] encloses optional elements.

In an illustrated embodiment, a code designated herein by the symbols "ddd" is added to the Ty specification to indicate the PFO-Rule-Remove AVP. The PFO-Rule-Remove AVP is type "Group" and includes the code "ddd" in the AVP header. The AVP group includes one of more AVPs. At least one of the included AVP is a PFO-Rule-Name AVP or a PFO-Rule-Base-Name AVP. The PFO-Rule-Remove AVP format can be stated by ABNF code of the form:

```
PFO-Rule-Remove    ::= <AVP Header: ddd >
                       *[ PFO-Rule-Name ]
                       *[ PFO-Rule-Base-Name ]
                       *[ AVP ]
```

The DSCP field 426 indicates a quality of service DSCP value to use for the session indicated by the session ID in field 414. The field is optional. If omitted, any previously set or configured DSCP value is used. If none is previously set or configured, then all packets for the session are marked as best effort.

In embodiments using a modified Ty interface for a Diameter Protocol, the DSCP field 426 includes an Authorized-DSCP AVP added to the conventional Ty specification. In an illustrated embodiment, a code designated herein by the symbols "eee" is added to the Ty specification to indicate the Authorized-DSCP AVP. The Authorized-DSCP AVP is of type integer 32 and includes 32 bits with a numerical value equal to the DSCP value. In some embodiments, the most-significant bit in the Authorized-DSCP value corresponds to bit 5 in the DSCP field; thus, an Authorized-DSCP AVP value of "46" corresponds to the DSCP code point "101110."

The event-trigger field 430 is included in a message 410 sent by the policy manager in response to notification that a particular event or condition has been detected by a PFO rule executed by the PEP. In some messages, the event-trigger field 430 is omitted. The event trigger field 430 may always be included in the RAR or CCA messages. The Event-Trigger field, when sent from the PM, instructs the enforcer about when to re-request PCC rules (including PFO rules). The event-trigger field 430 includes a DSCP triggered field 432 and a PFO action field 434.

In embodiments using a modified Ty interface for a Diameter Protocol, the Event-trigger field 430 is the Event-Trigger AVP of the conventional Ty specification, extended to include a modified Charging-Rule-Definition AVP and a PFO-Action AVP.

The Charging-Rule-Definition AVP, indicated by code 1003, of type Group, is extended to include the Authorized-DSCP AVP in the group. The included Authorized-DSCP AVP is an embodiment of the DSCP triggered field 432. For example, the modified Charging-Rule-Definition AVP is defined by the following ABNF code in which the added element is printed in bold font.

```
Charging-Rule-Definition ::= <AVP Header: 1003 >
                             [ Charging-Rule-Name ]
                             [ Service-Identifier ]
                             [ Rating-Group ]
                             [ Flow-Identifier ]
                             *[ Flow-Description ]
                             [ Flow-Status ]
                             [ Authorized-QoS ]
                             [ Authorized-DSCP ]
                             [ Reporting-Level ]
                             [ Online ]
                             [ Offline ]
                             [ Metering-Method ]
                             [ Precedence ]
                             [ AF-Charging-identifier ]
                             * [ Flows ]
                             * [ AVP ]
```

The PFO action field 434 holds data that indicates an action for the PEP to take in response to an event detected at the AG that caused the PEP to request further guidance from the PM. An example action indicated by the data in field 434 is one of the actions described above for field 277, e.g., drop, pass, remark, rate-limit-drop and rate-limit-remark. The DSCP to use in the two remark actions is the DSCP value included in field 432, if present, for current flow actions and the DSCP field 426 for current session actions. If none is present in the current message, the remark DSCP value is a most recently set DSCP value. If none, then the remark DSCP is best effort. The rate limit to use in the two rate limit actions is the rate limit value included in field 419, if any. If none is present in the current message, the rate limit value is a most recently set rate limit value. If none, then a default rate limit is used.

In embodiments using a modified Ty interface for a Diameter Protocol, the PFO action field 434 includes a PFO-Action AVP added to the conventional Ty specification. In an illustrated embodiment, a code designated herein by the symbols "fff" is added to the Ty specification to indicate the PFO-Action AVP. The PFO-Action AVP is of type "Enumerated" and takes on one of the five values 0 though 4 to indicate the five actions, as listed in Table 1. In other embodiments, other actions or other enumerated values, or both, are used.

TABLE 1

Example PFO-Action AVP enumerated values.

| Enumerated Value | Associated Action |
| --- | --- |
| 0 | Drop |
| 1 | Pass |
| 2 | Remark |

TABLE 1-continued

Example PFO-Action AVP enumerated values.

| Enumerated Value | Associated Action |
|---|---|
| 3 | Rate-limit-drop |
| 4 | Rate-limit-remark |

In some embodiments that use a modified Ty interface for a Diameter Protocol to format message 410, the following ABNF code defines the CC-Answer (CCA) Command format in which the added elements are printed in bold font.

```
<CC-Answer>    ::=  < Diameter Header: (272), PXY >
                    < Session-Id >
                    [ Auth-Application-Id ]
                    [ Origin-Host ]
                    [ Origin-Realm ]
                    [ Result-Code ]
                    [ Experimental-Result ]
                    [ CC-Request-Type ]
                    [ CC-Request-Number ]
                   *[ Event-Trigger ]
                    [ Origin-State-Id ]
                   *[ Charging-Rule-Remove ]
                   *[ Charging-Rule-Install ]
                   *[ PFO-Rule-Remove ]
                   *[ PFO-Rule-Install ]
                    [ PFO-Action ]
                    [ Charging-Information ]
                    [ Authorized-QoS ]
                    [ Authorized-DSCP ]
                    [ Error-Message ]
                    [ Error-Reporting-Host ]
                   *[ Failed-AVP ]
                   *[ Proxy-Info ]
                   *[ Route-Record ]
                   *[ AVP ]
```

In some embodiments that use a modified Ty interface for a Diameter Protocol to format message 410, the following ABNF code defines the RE-Auth-Request (RAR) Command format.

```
<RA-Request>   ::=  < Diameter Header: (258), REQ, PXY >
                    < Session-Id >
                    [ Auth-Application-Id ]
                    [ Origin-Host ]
                    [ Origin-Realm ]
                    [ Destination-Realm ]
                    [ Destination-Host ]
                    [ Re-Auth-Request-Type ]
                    [ Origin-State-Id ]
                   *[ Event-Trigger ]
                   *[ Charging-Rule-Remove ]
                   *[ Charging-Rule-Install ]
                   *[ PFO-Rule-Remove ]
                   *[ PFO-Rule-Install ]
                    [ Charging-Information ]
                    [ Authorized-QoS ]
                    [ Authorized-DSCP ]
                   *[ Proxy-Info ]
                   *[ Route-Record ]
                   *[ AVP ]
```

The RAR/RAA message type is used when the PM sends an unsolicited message, that is not in response to a event trigger from the enforcement process; and thus the PFO Action AVP is omitted.

FIG. 4B illustrates an example policy request message 450 sent from a policy enforcement process. In illustrated embodiments, the policy request message 450 is a modified Ty interface message, such as a modified unsolicited CC Request (CCR) Command or a modified solicited Re-Auth-Answer (RAA) Command.

Message 450 includes a message type field 452, a session ID field 454, a charging report field 456, a PFO rule report field 462 and an optional event-trigger field 470.

The message type field 452 holds data that indicates that the message 450 is a policy request message (e.g., a CCR), or a policy acknowledgement/success message (e.g., a RAA). For example, in embodiments using a modified Ty interface for a Diameter Protocol, the message type field includes data that indicates a CC-Request or a RA-Answer followed by the Diameter header fields.

The session ID field 454 holds data that uniquely indicates the session to which the policy applies. The session ID field 454 includes data that indicates the subscriber ID and the particular IP address. In embodiments using a modified Ty interface for a Diameter Protocol, the session ID field 414 includes the Ty-Diameter Session ID field and the Auth-Application-Id field in the conventional Ty specification.

The charging report field 456 holds data that indicates the charging rule that has been applied to a particular data flow for the subscriber associated with the current session ID in field 454. In embodiments using a modified Ty interface for a Diameter Protocol, the charging report field 456 includes the Charging-Rule-Report field in the conventional Ty specification.

The PFO rule report field 462 holds data that indicates the PFO rule that has been applied to a particular data flow for the subscriber associated with the current session ID in field 454. When the rule detects a triggering event, the PFO rule report field 462 indicates the PFO rule that detected the trigger conditions.

In embodiments using a modified Ty interface for a Diameter Protocol, the PFO report field 462 includes a PFO-Rule-Report AVP that includes either a PFO-Rule-Name AVP or a PFO-Rule-Base-Name AVP or a PFO-Rule-Status AVP, all added to the conventional Ty specification, or some combination. The PFO-Rule-Name AVP and PFO-Rule-Base-Name AVP have been described above.

In an illustrated embodiment, a code designated herein by the symbols "ggg" is added to the Ty specification to indicate a PFO-Rule-Status AVP. The PFO-Rule-Status AVP is of type Enumerated and takes on one of the three values 0 though 2 to indicate the status states, as listed in Table 2. In other embodiments, other states or other enumerated values, or both, are used.

TABLE 2

Example PFO-Rule-Status AVP enumerated values.

| Enumerated Value | Associated Status |
|---|---|
| 0 | Active |
| 1 | In active |
| 2 | Temporarily Inactive |

An active status means that the PFO rules named are successfully activated on a data flow of the session indicated in session ID field 454. Active PFO rules are candidates for the policy manager to remove. An inactive status means that the PFO rules named are no longer active on the session indicated in session ID field 454. Inactive PFO rules, for example, are PFO rules that have just been removed by the policy manager or that have been removed by the AG itself, due to some local reason, e.g. resource exhaustion or another failure. Inactive PFO rules are not reinstalled automatically. A temporarily inactive status means that the PFO rules named that have previously been active are temporarily disabled, for example, due to a loss of a data flow. Temporarily inactive PFO rules are reinstalled automatically once the underlying disabling cause disappears.

The PFO-Rule-Report AVP format can be stated by ABNF code of the form:

```
PFO-Rule-Install    ::= <AVP Header: ggg >
                        *[ PFO-Rule-Name ]
                        *[ PFO-Rule-Base-Name ]
                        *[ PFO-Rule-Status ]
                        *[ AVP ]
```

The event-trigger field 470 is included in message 450 to notify the policy manager that a particular event has been detected by a PFO rule executed at the PEP. In other policy request messages, the event-trigger field 470 is omitted. The event-trigger field 470 includes a PFO trigger data field 472.

The PFO trigger data field 472 includes data that indicates the conditions or event that caused the trigger to fire. In various embodiments, the PFO trigger data field 472 holds data that indicates a subscriber identity associated with the data flow that caused the trigger to fire, the service performed by the PFO rule that caused the trigger to fire, and a 5-tuple that identifies the data flow that caused the trigger to fire. A 5-tuple is a set of five values that identify the flow. Typically, the 5-tuple includes the values of the source IP address of the node that sent the data packets of the data flow, the source port number that indicates a process executing on the node having the source IP address, the destination IP address, the destination port number, and the transport protocol (e.g., the Transmission Control Protocol, TCP). In addition to these, in some embodiments, field 472 includes data that indicates layer 7 information. It is assumed for purposes of illustration that, in the case of HTTP browsing, the PFO field 472 includes data that indicates information contained in HTTP messages, such as a URL. The information in the PFO trigger data field 472 is used by the PFO policy management process to determine what PFO action to indicate, in response, in the PFO action field 434, described above.

In embodiments using a modified Ty interface for a Diameter Protocol, the event-trigger field 470 is the Event-Trigger AVP of the conventional Ty specification, and the PFO trigger data field 472 includes a service indicated in the standard Event-Trigger AVP, and a subscriber ID and flow 5-tuple in other fields of the standard CCR command outside the Event-Trigger AVP. For example, the subscriber ID is in the Subscription-Id field of the conventional Ty interface CCR command; and the flow 5-tuple is in the Flow-Info AVP of the conventional Ty interface CCR command.

In some embodiments that use a modified Ty interface for a Diameter Protocol to format message 450, the following ABNF code defines the CC-Request (CCR) Command format, in which added elements are printed in bold font.

```
<CC-Request>   ::=  < Diameter Header: xxx (272), PXY >
                    < Session-Id >
                    [ Auth-Application-Id ]
                    [ Origin-Host ]
                    [ Origin-Realm ]
                    [ Destination-Realm ]
                    [ CC-Request-Type ]
                    [ CC-Request-Number ]
                    [ Destination-Host ]
                    [ Origin-State-Id ]
                    *[ Subscription-Id ]
                    [ Flow-Operation ]
                    *[ Flow-Info ]
                    [ Framed-IP-Address ]
                    [ Framed-IPv6-Prefix ]
                    [ RAT-Type ]
                    [ Termination-Cause ]
                    [ User-Equipment-Info ]
                    [ AGW-MCC-MNC ]
                    [ AGW-IP-Address ]
                    [ AGW-IPv6-Address ]
                    [ Called-Station-ID ]
                    *[ Charging-Rule-Report ]
                    *[ PFO-Rule-Report ]
                    *[ Event-Trigger ]
                    *[ Proxy-Info ]
                    *[ Route-Record ]
                    *[ AVP ]
```

An advantage of using structures and methods already established for the Ty interface, with a few proposed modifications indicated above, is that centralized PFO policy management can be achieved with reduced effort compared to establishing a new PFO management protocol for message 410 and message 450.

4.0 PFO Policy Methods

Figure 5:
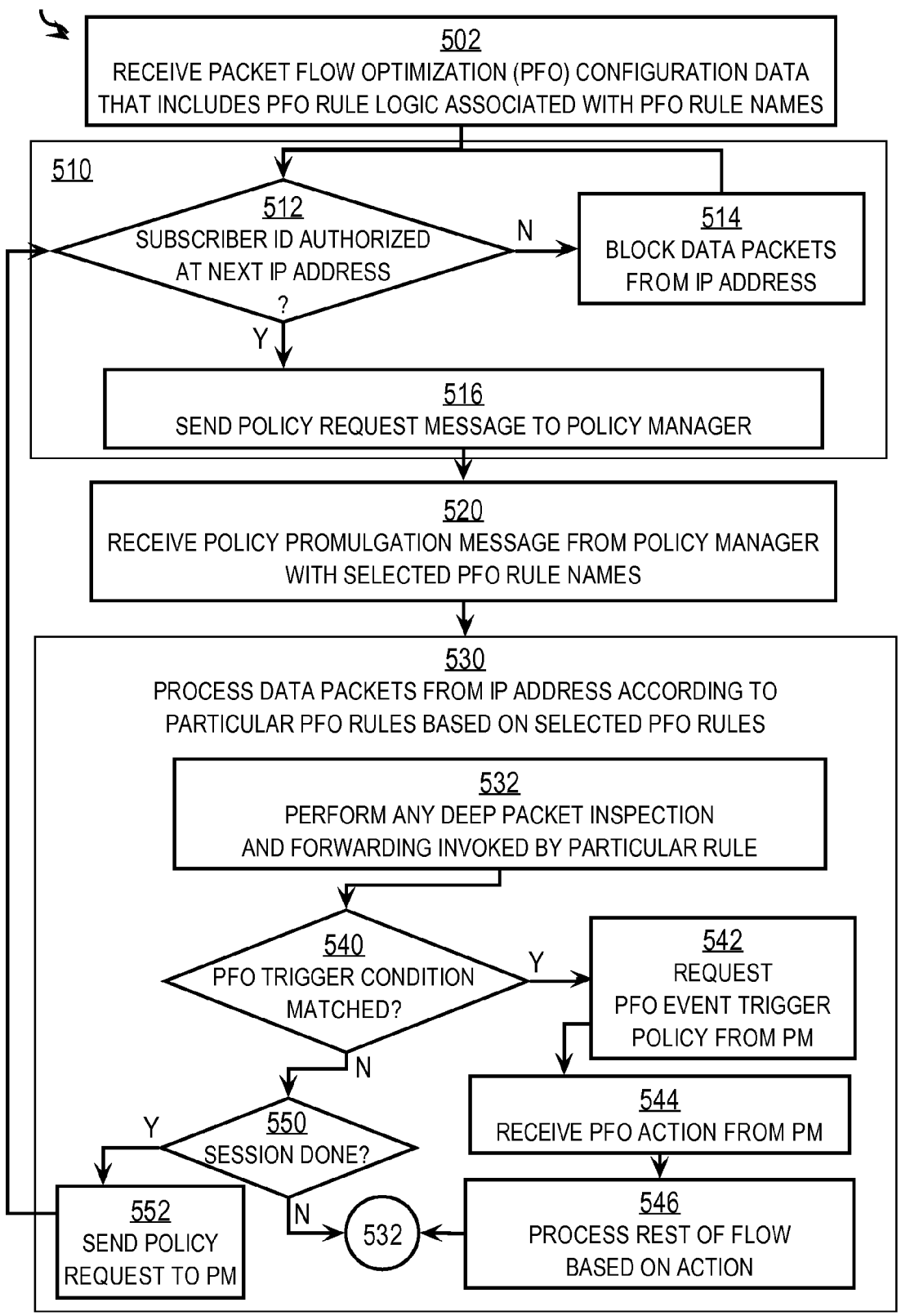
FIG. 5 illustrates, at a high level, an example method in a policy enforcement process.
Figure 6:
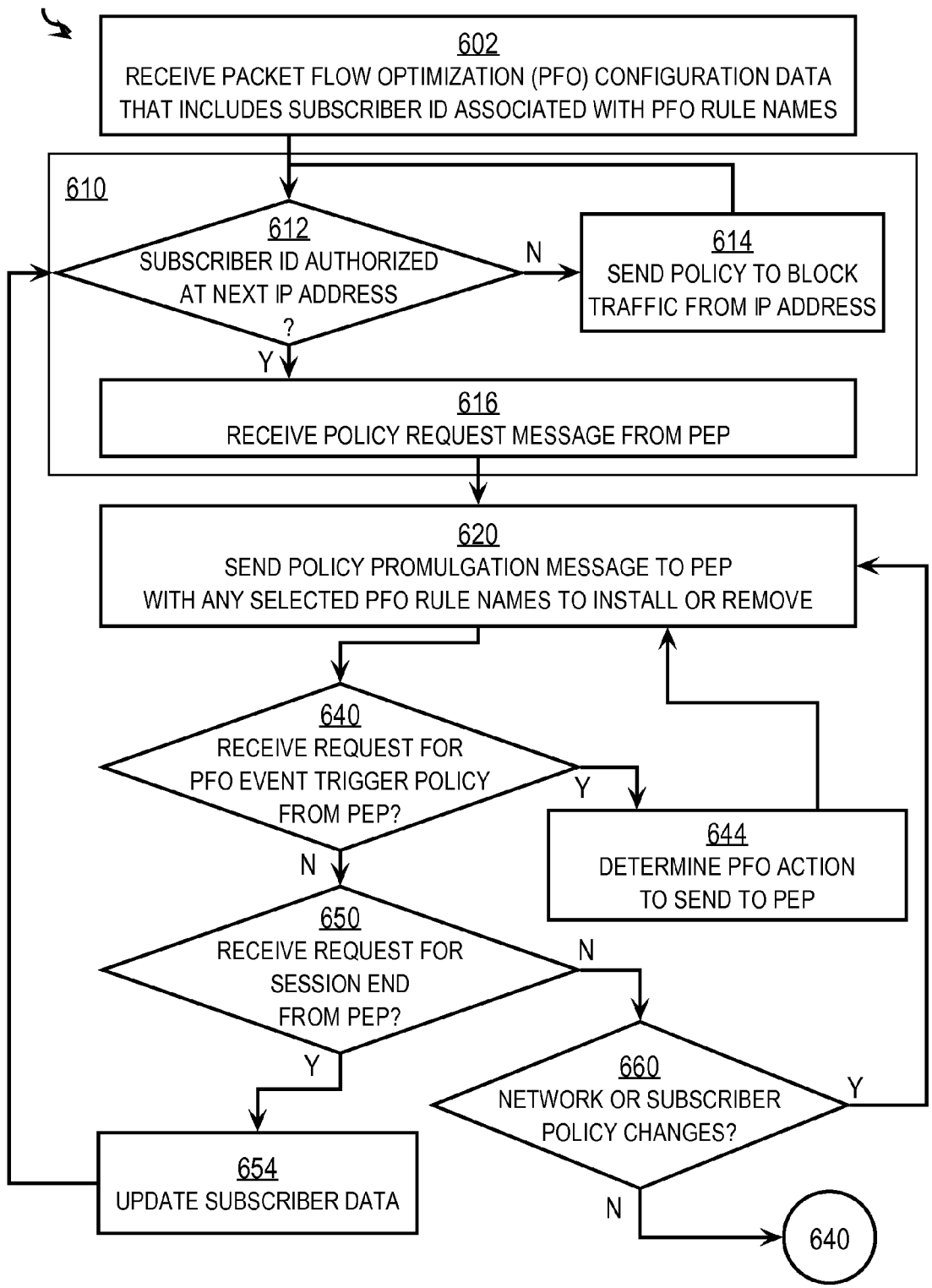
FIG. 6 illustrates, at a high level, an example method in a policy management process.

FIG. 5 illustrates, at a high level, an example method 500 in a policy enforcement process. Although steps in FIG. 5 and subsequent flow chart, FIG. 6, are show in a particular order for purposes of illustration, in other embodiments, one or more steps may be performed in a different order or overlapping in time, in series or in parallel, or one or more steps may be omitted or added, or changed in some combination of ways In step 502, PFO configuration data is received that includes PFO rule logic associated with each of multiple PFO rule names. For example, the logic for Under18Web, Under18games are associated with those names and for the group name Under18. Other PFO rule names and associated logic are also included, such as logic for voice services from server 170a and from server 170b, and logic for multimedia conferencing, and logic for HTTP packets destined for cell phones—all with associated names and group names. This configuration data is stored in PFO rule logic structure 150 in PEP 128 on AG node 125.

Any method may be used to receive this data. For example, in various embodiments, the data is included as default values in software instructions and logic circuits, is received as manual input from a network administrator on the local or a remote node, is retrieved from a local file or database, or is sent from a different node on the network, either in response to a query or unsolicited, or the data is received using some combination of these methods.

In step 510, an end node network address, such as an IP address 111.222.33.2 for node 120b, is associated with a user ID, such as jane123@ispxyz.com. This association is a result of a user authentication process. For purposes of illustration, it is assumed that an authentication process within PEP 128 performs user authentication for the user of end nodes connected to access network 110a. In this embodiment, step 510 includes step 512, step 514 and step 516. In other embodiments, the association is made as a result of a message received from the process that did perform user authentication.

In step 512, it is determined whether the subscriber ID provided by the user of end node 120a at an IP address (called the next IP address for convenience) is authenticated as the subscriber (e.g., by knowledge of the correct password) and authorized to access the network 100 (e.g., because the subscriber billing account is paid up to date). If not, control passes to step 514 to block traffic from that IP address (or to not assign an IP address). If so, control passes to step 516.

For example, a user logon response to a prompt for user name and password includes user name jane123@ispxyz.com and password *********** and is passed to AAA server 114. AAA server 114 returns a message to the authentication process, such as PEPE 128 on AG node 125a that the user name and password are correct and that the subscriber's accounts are paid up to date so that access to the network 100 may be granted. Control passes to step 516.

In step 516, a policy request message is sent to PM 160 that indicates the subscriber ID. For example, policy request message 450 is sent with a value in the session ID field 454 that is associated with a subscriber ID, such as in a Subscription-ID field in the standard Ty interface. If any default PFO rules have been defined for traffic received at AG node 125a, names for those rules are included in PFO rule report field 462. For purposes of illustration, it is assumed that there is no default PFO rule associated with this subscriber and data field 462 is empty. There is no event trigger data and so event trigger field 470 is omitted.

In step 520, a policy promulgation message, such as message 410, with one or more selected PFO rule names or group name is received from the PM, e.g., PM 160. In some embodiments, the policy promulgation message is received in response to sending the policy request message in step 516. In such embodiments, the policy promulgation message may be formatted as a Ty interface CCA Command. In some embodiments, in which authentication is not performed by PEP 128 on AG node 125a, the policy promulgation message is sent by the policy manager unsolicited by the PEP. For example, when the PM 160 performs the authentication process or when a different process performs the authentication process and advises the policy manager of the successfully authenticated subscriber ID and associated IP address (and the AG node involved), or when there is a change in the policy by the SP, then the PM 160 sends the policy promulgation message unsolicited to the PEP. In such embodiments, the policy promulgation message may be formatted as a Ty interface RAR Command.

For example, message 410 is sent to a PEP 128 on AG node 125a with data in the session ID field 414 that is associated with the subscriber ID (e.g., jane123@ispxyz.com) in a Subscription-Id field and with the IP address of the node being used (e.g., 111.222.33.2) in a Framed-IP-Address field. Data in the PFO rule names(s) field 422 indicates the group name Under18 should be installed; and data in the DSCP field 426 indicates an appropriate DSCP value for jane123@ispxyz.com. Because the message sent during step 520 is not in response to a triggered event, the event-trigger field 430 is omitted.

In step 530, data packets directed to or from the IP address associated with the subscriber ID are subjected to particular PFO rules based on those signaled rules named in the PFO rule name(s) field 422. The particular PFO rules applied include any PFO rule names installed and include none of the PFO rule names removed.

For example data packets directed to or from IP address 111.2222.33.2 are subjected to the Under18 group of rules.

Step 530 includes step 532 to perform any deep packet inspection and forwarding based on the particular rules. Control then passes to step 540.

For example, in step 532, deep packet inspection determines, based on the HTTP protocol in the payload of the IP data packet, that a data packet from IP address 111.222.33.2 directed to server 170c is a request for a World Wide Web page. According to the logic of the Under18Web rule, the request is not forwarded unless and until the target website is checked against an age appropriate filter and found to contain acceptable material. In another example, deep packet inspection in a VoIP rule is used to identify and prioritize VoIP traffic among other traffic (e.g., Web traffic) to guarantee a particular subscribed level of QoS for the session. In another example, deep packet inspection in a default (no IM) rule is used to identify and drop or rate limit instant messaging traffic.

Some rules logic includes detecting conditions or events that trigger a further request for PFO policy. Step 530 includes performing one or more further exchanges with the policy manager while processing data packets based on the named rules. For purposes of illustration, it is assumed that the Under18group of rules includes an Under18voice rule that includes logic that requires further guidance from the policy manager when voice services are requested from server 170a.

In step 540, it is determined whether a PFO trigger condition is matched. If so, then control passes to step 542.

For example, if it is determined that a data packet from IP address 111.222.33.2 to server 170a includes in its IP payload a request for voice services, then the PFO trigger event for the Under18voice rule logic is matched and control passes to step 542.

In step 542, a PFO policy request message, such as message 450, with a PFO event trigger field 470 is sent to the Policy Manager (PM). Control then passes to step 544.

For example, during step 542, a policy request message 450 is sent from the PEP on AG node 125a to PM 160. The PFO rule report data 462 holds data that indicates the PFO rule is Under18voice and the status is Active. The PFO trigger data 472 holds data that indicates the subscriber is jane123@ispxyz.com, the service name is server 170a voice service, and the 5-tuple indicating the source and receiver IP address, ports and transport protocol that marks the flow. It is assumed for purposes of illustration that the server 170a voice service is VoiceFree, and the data flow 5-tuple is {111.222.33.2; 199.299.99.9; UDP; 1234; 1235} corresponding to the source IP address, destination IP address, transport protocol, source port and destination port, respectively. Control then passes to step 544.

In step 544, a message is received from the policy manager with a PFO action. For example, a policy promulgation message 410, such as a Ty interface CCA Command, is received with Event trigger field 430 included. The event trigger field 430 includes PFO action field 434. Control then passes to step 546.

For purposes of illustration, it is assumed that the PFO action field 434 holds data that indicates rate-limit-drop. QoS data field 418 includes rate limit field 419. It is further assumed for purposes of illustration that the data in the rate limit field 419 indicates 30 thousand bits per second (30 Kilobps, Kbps, 1 Kbps=1024 bits per second). Thus, in step 544, a message is received from the PM 160 that indicates the voice service data flows that caused the trigger to fire may pass up to the rate limit of 30 Kbps. Control then passes to step 546.

In step 546, the rest of the same data flow is processed based on the action indicated in the message received during step 544. For example, data packets of that voice flow with 5-tuple {111.222.33.2; 199.299.99.9; UDP; 1234; 1235}, which drive the data rate above 30 Kbps, are dropped. Control then passes back to step 532 to perform any deep packet inspection and forwarding invoked by the particular rules.

If it is determined, in step 540, that the PFO trigger condition is not matched, then control passes to step 550.

In step 550 it is determined whether the current session is terminated. If not, control passes back to step 532 to perform any deep packet inspection and forwarding invoked by the logic of the particular rules. However, if it is determined that the session is terminated, for example because of a receipt of a logoff message, or because of silence from the IP address for an extended time, then control passes to step 552. In step 552 a policy request message, such as message 450, is sent to the PM to indicate the session is terminated. Control then passes to step 510 to associate another subscriber ID with a next IP address.

FIG. 6 illustrates, at a high level, an example method 600 in a policy management process. In step 602, PFO configuration data is received that includes subscriber IDs, each associated with one or more of multiple PFO rule names. For example, the subscriber ID jane123@ispxyz.com is associated with the group name Under18. This configuration data is stored in subscriber PFO rule names structure 152 on PM 160. Any method may be used to receive this data, as described above for step 502.

In step 610, an end node network address, such as an IP address 111.222.33.2 for node 120b, @is associated with a user ID, such as jane123@ispxyz.com. This association is a result of a user authentication process. For purposes of illustration, it is assumed that PM 160 performs user authentication for logon messages received at AG nodes 125. In this embodiment, step 610 includes step 612 and step 614; and step 616 is omitted.

In step 612, it is determined whether the subscriber ID provided by the user of end node 120b at an associated IP address (called the next IP address for convenience) is authenticated as the subscriber (e.g., by knowledge of the correct password) and authorized to access the destination network 110b (e.g., because the subscriber billing account is paid up to date). If not, control passes to step 614 to send a policy promulgation message to block traffic from that IP address (or deny assigning an IP address). If so, control passes to step 616.

For example, a user logon response to a prompt for user name and password includes user name jane123@ispxyz.com and password ********* and is passed to AAA server 114. AAA server 114 returns a message to an authentication process, such as in PM 160, that indicates the user name and password are correct and that the subscriber's accounts are paid up to date so that access to the destination network 110b may be granted. Control passes to step 616. If step 616 is omitted, control passes directly to step 620**.

In other embodiments, the association is made by PEP 128 on AG node 125, as described above, which sends a policy request message, as described above in step 516. The policy request message is received in step 616; and step 612 and step 614 are omitted.

In step 616, a policy request message is received from the PEP 128 that indicates the subscriber ID. For example, policy request message 450 is received with a subscriber ID associated with the session ID field 454, for example in a Ty Diameter Subscription-Id field. If any default PFO rules have been defined for traffic received at PEP 128 on AG node 125a, names for those rules are included in PFO rule report field 462. For purposes of illustration, it is assumed that there is no default PFO rule associated with this subscriber and data field 462 is empty. There is no event trigger data and so event trigger field 470 is omitted.

In step 620, a policy promulgation message, such as message 410, with one or more selected PFO rule names or group name associated in the configuration data received during step 602 with the subscriber ID, is sent from the policy manager to the policy enforcement process. In some embodiments, the policy promulgation message is sent in response to receiving the policy request message in step 616. In such embodiments, the policy promulgation message may be formatted as a Ty interface CCA Command. In some embodiments, in which authentication is not performed by a PEP on the AG node 125, the policy promulgation message is sent by the policy management process unsolicited. For example, when the policy manager 160 performs the authentication process or when a different process performs the authentication process and advises the policy manager of the successfully authenticated subscriber ID associated IP address and the AG node involved, or when there is a change in the policy by the SP, then the policy manager 160 sends the policy promulgation message unsolicited to the policy enforcer on the AG node 125. In such embodiments, the policy promulgation message may be formatted as a Ty interface RAR Command For example, message 410 is sent to PEP 128 on AG node 125a with data in the session ID field 414 that is associated with the subscriber ID (e.g.,jane123@ispxyz.com) in a subscription-Id field and the IP address of the node being used (e.g., 111.222.33.2) in a Framed-IP-Address field. Data in the PFO rule names(s) field 422 indicates the group name Under18 should be installed; and data in the DSCP field 426 indicates an appropriate DSCP value for jane123. Because the message sent during step 620 is not in response to a triggered event, the event-trigger field 430 is omitted.

Some rules logic includes detecting conditions or events that trigger a further request for PFO policy. In step 640, it is determined whether a policy request message, such as message 450, with a PFO event trigger is sent by the PEP to the PM. If so, control passes to step 644.

For example, during step 640, it is determined that a policy request message 450 is received from the PEP 128 on AG node 125a. The PFO rule report data 462 holds data that indicates the PFO rule is Under18voice and the status is Active. The PFO trigger data 472 holds data that indicates the subscriber is jane123@ispxyz.com, the service name is VoiceFree, and the data flow 5-tuple is {111.222.33.2; 199.299.99.9; UDCP; 1234; 1235} corresponding to the source IP address, destination IP address, transport protocol, source port and destination port, respectively. Control then passes to step 644.

In step 644, a PFO action in response to the triggered event is determined. For example, logic 220 is executed to determine a PFO action in response to the triggered event. In some embodiments, the logic 220 determines the response in general, without regard to a particular subscriber. In some embodiments, the response is subscriber dependent; and the logic 220 reads the trigger response field 277 in the subscriber record 270 in which the data in the subscriber ID field 272 matches the subscriber ID associated with the session indicated in the session ID field 454 of the request message 450.

For purposes of illustration, it is assumed that the trigger response field 277 in the subscriber record for jane123@ispxyz.com holds data that indicates rate-limit-drop in response to a triggered event from rule named Under18voice. In some embodiments, data from the Under18voice rule is included in field 472, e.g., to indicate the service name or application or condition, and used in logic 220 to determine a subscriber-independent or subscriber-dependent PFO action.

Control then passes to step 620 to send the policy promulgation message, such as message 410. For example, a policy promulgation message 410, such as a Ty interface CCA Command, is sent with Event trigger field 430 included. The event trigger field 430 includes PFO action field 434 that holds data that indicates the rate-limit-drop action. QoS data field 418 includes rate limit field 419. The data in the rate limit field 419 indicates 30 Kbps. Thus, in step 620, a message 410 is sent from the PM 160 that indicates the voice service data flows that caused the trigger to fire may pass up to the rate limit of 30 Kbps and drop data packets beyond that rate limit.

If it is determined in step 640 that a policy request message 450 is not received from the PEP, then control passes to step 650. In step 650, it is determined whether a policy request message 450 is received from the PEP that indicates session end. If so, control passes to step 654 to update the subscriber data and back to step 610 to associates another subscriber and IP address.

If it is determined in step 650 that a policy request message 450 is not received from the PEP that indicates session end, then control passes to step 660. In step 660, it is determined whether there has been a change in one or more network or subscriber PFO policies. If not, control passes back to step 640 and following steps to determine whether a policy request message is received. However, if it is determined, in step 660, that there has been a change in one or more network or subscriber PFO policies, then control passes back to step 620 to send a policy promulgation message, this time unsolicited, to convey the PFO policy change to the PEP on the AG nodes 125.

Using the methods 500 and 600 on the policy enforcement process and the policy management process, respectively, PFO policy is managed at several AG nodes from a central policy manager, in addition to the charging and quality of service policies already managed by the policy manager.

5.0 Implementation Mechanisms—Hardware Overview

Figure 7:
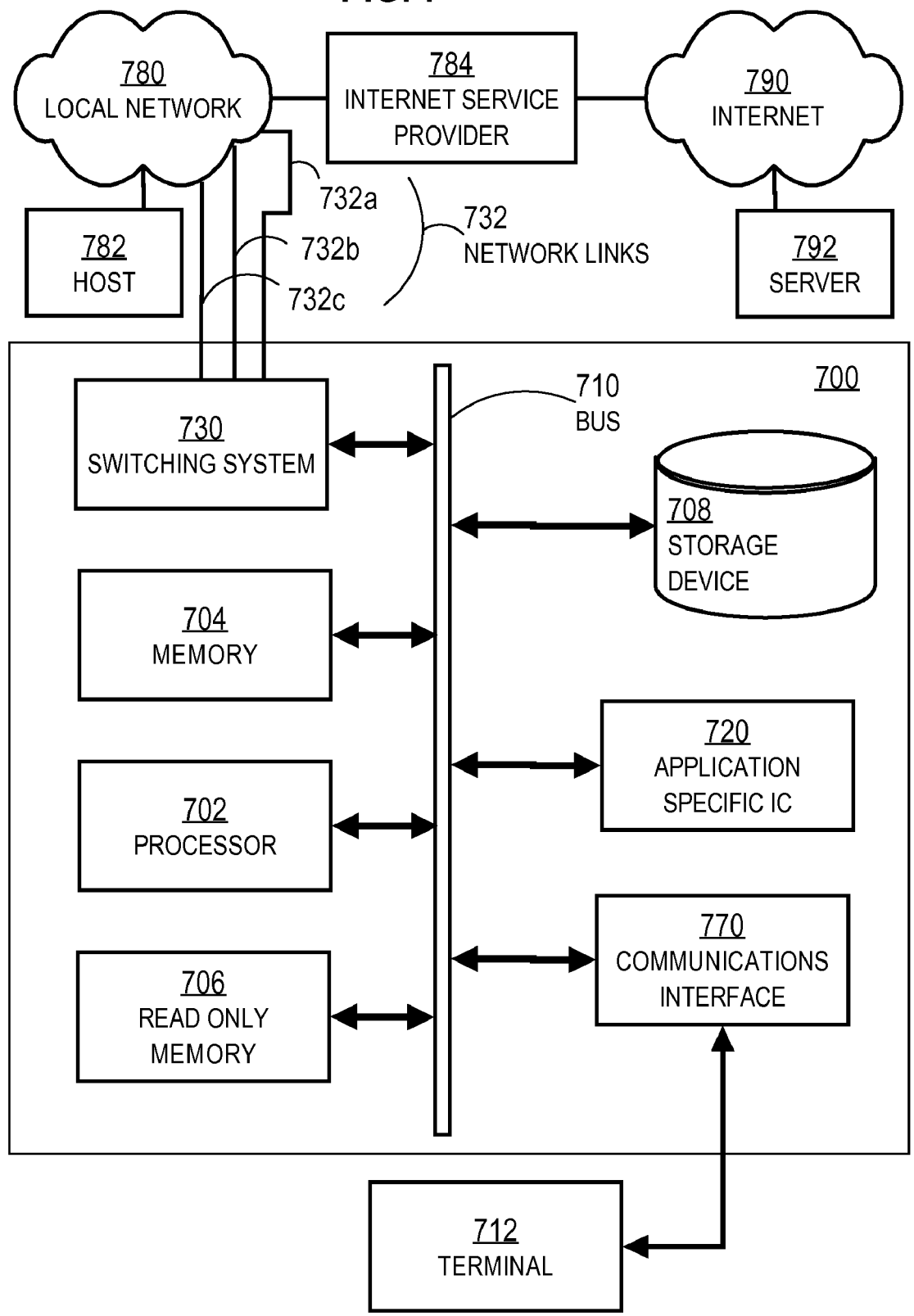
FIG. 7 illustrates an example computer system upon which an embodiment may be implemented.

FIG. 7 illustrates a computer system 700 upon which an embodiment may be implemented. The preferred embodiment is implemented using one or more computer programs running on a network element such as a router device. Thus, in this embodiment, the computer system 700 is a router.

Computer system 700 includes a communication mechanism such as a bus 710 for passing information between other internal and external components of the computer system 700. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 710 includes many parallel conductors of information so that information is transferred quickly among devices coupled to the bus 710. One or more processors 702 for processing information are coupled with the bus 710. A processor 702 performs a set of operations on information. The set of operations include bringing information in from the bus 710 and placing information on the bus 710. The set of operations also typically include comparing two or more units of information, shifting positions of units of information, and combining two or more units of information, such as by addition or multiplication. A sequence of operations to be executed by the processor 702 constitutes computer instructions.

Computer system 700 also includes a memory 704 coupled to bus 710. The memory 704, such as a random access memory (RAM) or other dynamic storage device, stores information including computer instructions. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of computer instructions. The computer system 700 also includes a read only memory (ROM) 706 or other static storage device coupled to the bus 710 for storing static information, including instructions, that is not changed by the computer system 700. Also coupled to bus 710 is a non-volatile (persistent) storage device 708, such as a magnetic disk or optical disk, for storing information, including instructions, that persists even when the computer system 700 is turned off or otherwise loses power.

The term computer-readable medium is used herein to refer to any medium that participates in providing information to processor 702, including instructions for execution. Such a medium may take many forms, including, but not limited to, non-volatile media, volatile media and transmission media. Non-volatile media include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made variations in amplitude, frequency, phase, polarization or other physical properties of carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Information, including instructions, is provided to the bus 710 for use by the processor from an external terminal 712, such as a terminal with a keyboard containing alphanumeric keys operated by a human user, or a sensor. A sensor detects conditions in its vicinity and transforms those detections into signals compatible with the signals used to represent information in computer system 700. Other external components of terminal 712 coupled to bus 710, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 712. In some embodiments, terminal 712 is omitted.

Computer system 700 also includes one or more instances of a communications interface 770 coupled to bus 710. Communication interface 770 provides a two-way communication coupling via transmission media to a variety of external devices that operate with their own processors, such as printers, scanners, external disks, and terminal 712. Firmware or software running in the computer system 700 provides a terminal interface or character-based command interface so that external commands can be given to the computer system. For example, communication interface 770 may be a parallel port or a serial port such as an RS-232 or RS-422 interface, or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented using carrier waves. For wireless links, the communications interface 770 sends and receives electrical, acoustic or electromagnetic signals, including infrared and optical signals, which carry information streams, such as digital data.

In the illustrated embodiment, special purpose hardware, such as an application specific integrated circuit (IC) 720, is coupled to bus 710. The special purpose hardware is configured to perform operations not performed by processor 702 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware. Logic encoded in one or more tangible media includes one or both of computer instructions and special purpose hardware.

In the illustrated computer used as a router, the computer system 700 includes switching system 730 as special purpose hardware for switching information for flow over a network. Switching system 730 typically includes multiple communications interfaces, such as communications interface 770, for coupling to multiple other devices. In general, each coupling is with a network link 732 that is connected to another device in or attached to a network, such as local network 780 in the illustrated embodiment, to which a variety of external devices with their own processors are connected. In some embodiments, an input interface or an output interface or both are linked to each of one or more external network elements. Although three network links 732a, 732b, 732c are included in network links 732 in the illustrated embodiment, in other embodiments, more or fewer links are connected to switching system 730. Network links 732 typically provides information communication via transmission media through one or more networks to other devices that use or process the information. For example, network link 732b may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790. A computer called a server 792 connected to the Internet provides a service in response to information received over the Internet. For example, server 792 provides routing information for use with switching system 730.

The switching system 730 includes logic and circuitry configured to perform switching functions associated with passing information among elements of network 780, including passing information received along one network link, e.g. 732a, as output on the same or different network link, e.g., 732c. The switching system 730 switches information traffic arriving on an input interface to an output interface according to pre-determined protocols and conventions that are well known. In some embodiments, switching system 730 includes its own processor and memory to perform some of the switching functions in software. In some embodiments, switching system 730 relies on processor 702, memory 704, ROM 706, storage 708, or some combination, to perform one or more switching functions in software. For example, switching system 730, in cooperation with processor 704 implementing a particular protocol, can determine a destination of a packet of data arriving on input interface on link 732a and send it to the correct destination using output interface on link 732c. The destinations may include host 782, server 792, other terminal devices connected to local network 780 or Internet 790, or other routing and switching devices in local network 780 or Internet 790.

The disclosure is related to the use of computer system 700 for implementing the techniques described herein. According to one embodiment, those techniques are performed by computer system 700 in response to processor 702 executing one or more sequences of one or more instructions contained in memory 704. Such instructions, also called software and program code, may be read into memory 704 from another computer-readable medium such as storage device 708. Execution of the sequences of instructions contained in memory 704 causes processor 702 to perform the method steps described herein. In alternative embodiments, hardware, such as application specific integrated circuit 720 and circuits in switching system 730, may be used in place of or in combination with software to implement an embodiment. Thus, embodiments are not limited to any specific combination of hardware and software, unless otherwise explicitly stated.

The signals transmitted over network link 732 and other networks via transmission media through communications interfaces such as interface 770, carry information to and from computer system 700. Computer system 700 can send and receive information, including program code, through the networks 780, 790 among others, through network links 732 and communications interfaces such as interface 770. In an example using the Internet 790, a server 792 transmits program code for a particular application, requested by a message sent from computer 700, through Internet 790, ISP equipment 784, local network 780 and network link 732b through communications interface in switching system 730. The received code may be executed by processor 702 or switching system 730 as it is received, or may be stored in storage device 708 or other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 732b. An infrared detector serving as communications interface in switching system 730 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702 or switching system 730.

6.0 Extensions and Alternatives

In the foregoing specification, specific embodiments have been described. It will, however, be evident that various modifications and changes may be made thereto without departing from the broader spirit and scope of the disclosure. The specification and drawings are, accordingly, to be regarded in an illustrative rather than a restrictive sense.

What is claimed is:

1. A method comprising:
   receiving packet flow optimization (PFO) configuration data that associates each rule name of a plurality of PFO rule names with a corresponding method for processing a data packet in a communications network based on data in a payload of a layer 3 protocol of the data packet, wherein at least one PFO rule identifies an Internet protocol (IP) address of a subscriber, a quality of service (QOS) policy associated with the subscriber, and a billing policy associated with the subscriber, and wherein the PFO rule includes a field identifying how packets for the subscriber are to be forwarded in the communications network;
   receiving, from a policy management process in the communications network, a first policy message that includes rule data that indicates a signaled rule name of the plurality of PFO rule names associated with a particular network address in the communications network; and
   in response to receiving the first policy message, processing a data packet of the particular network address according to a particular method associated with a particular rule name that is selected based on the signaled rule name, wherein the first policy message includes data formatted according to a Ty interface Specification and includes a PFO rule-name attribute-value pair (AVP), which comprises data indicative of the signaled rule name.

2. A method as recited in claim 1, said step of receiving the first policy message further comprising receiving one of a Diameter Credit Control protocol Answer (CCA) command or a Re-Auth-Request (RAR) command extended according to a 3GPP2 Ty interface specification.

3. A method as recited in claim 1, wherein:
   the signaled rule name is a rule name to be removed from application to data packets of the particular network address; and
   the particular rule name is different from the signaled rule name.

4. A method as recited in claim 1, wherein:
   the signaled rule name is a rule name to be installed for application to data packets of the particular network address; and
   the particular rule name is the signaled rule name.

5. A method as recited in claim 1, wherein a group rule name of the plurality of PFO rule names indicates a particular plurality of different rule names of the plurality of PFO rule names.

6. A method as recited in claim 1, said step of processing the data packet received from the particular network address further comprising:
   determining a particular flow category of the data packet based on data in the payload of the layer 3 protocol of the data packet;
   determining in the particular method whether the data packet includes data that matches a trigger condition for requesting further policy data from the policy manager, and
   if it is determined that the data packet includes data that matches the trigger condition, then sending to the policy manager process a PFO policy request message that includes data that indicates the trigger condition.

7. A method as recited in claim 6, said step of sending the PFO policy request message further comprising sending the PFO policy request message that includes:
   data formatted according to a Ty interface specification of a $3^{rd}$ Generation Partnership Project 2 (3GPP2); and
   a PFO-rule-report attribute-value pair (AVP) that is added to the Ty interface specification, and that holds data that indicates the rule that detected the trigger condition.

8. A method as recited in claim 6, said step of processing the data packet received from the particular network address further comprises:
   in response to sending the PFO policy request message, receiving a second policy message that includes action data that indicates how to process a data packet in the particular flow category; and
   processing a data packet in the particular flow category based on the action data.

9. A method as recited in claim 8, said step of receiving the second policy message further comprising receiving the second policy message that includes:
   data formatted according to a Ty interface specification of a $3^{rd}$ Generation Partnership Project 2 (3GPP2); and
   a PFO-action attribute-value pair (AVP) that is added to the Ty interface specification, and that holds the action data.

10. A method as recited in claim 8, wherein the action data indicates passing data packets in the particular flow category.

11. A method as recited in claim 8, wherein the action data indicates dropping data packets in the particular flow category.

12. A method as recited in claim 8, wherein the action data indicates marking data packets in the particular flow category with a particular maximum quality of service.

13. A method as recited in claim 12, wherein the particular maximum quality of service is a Differentiated Services Code Point (DSCP) value in an authorized-DSCP attribute value pair that is added to a Ty interface specification of a $3^{rd}$ Generation Partnership Project 2 (3GPP2) for a charging-rule-definition attribute value pair of the Ty Interface specification.

14. A method as recited in claim 8, wherein the action data indicates an action to take above a particular number of data packets in the particular flow category during a unit of time.

15. A method as recited in claim 14, wherein the particular number of data packets during the unit of time is indicated in an authorized-QoS attribute value pair of a Ty interface specification of a $3^{rd}$ Generation Partnership Project 2 (3GPP2).

16. A method as recited in claim 1, said step of receiving the first policy message further comprising:
   sending to the policy management process a policy request message that includes data that indicates the user identifier and the particular network address; and
   performing said step of receiving the first policy message in response to sending the policy request message.

17. A method comprising:
   receiving packet flow optimization (PFO) configuration data that associates each user identifier of a plurality of user identifiers with a corresponding rule name of a plurality of PFO rule names, wherein at least one PFO rule identifies an Internet protocol (IP) address of a subscriber, a quality of service (QOS) policy associated with the subscriber, and a billing policy associated with the subscriber, and wherein the PFO rule includes a field identifying how packets for the subscriber are to be forwarded in a communications network;

associating a particular user identifier of the plurality of user identifiers with a particular network address in the communications network; and sending, to a policy enforcement process in the communications network, a first policy message that includes, in association with the particular network address, rule data that indicates a signaled rule name associated with the particular user identifier, and wherein the first policy message includes data formatted according to a Ty interface Specification and includes a PFO rule-name attribute-value pair (AVP), which comprises data indicative of the signaled rule name, and wherein the policy enforcement process processes a data packet of the particular network address based on data in a payload of a layer 3 protocol of the data packet according to a particular method associated with a particular rule name that is selected based on the signaled rule name, whereby a PFO policy is controlled at the policy enforcement process.

18. An apparatus comprising:

means for receiving packet flow optimization (PFO) configuration data that associates each rule name of a plurality of PFO rule names with a corresponding method for processing a data packet in a communications network based on data in a payload of a layer 3 protocol of the data packet, wherein at least one PFO rule identifies an Internet protocol (IP) address of a subscriber, a quality of service (QOS) policy associated with the subscriber, and a billing policy associated with the subscriber, and wherein the PFO rule includes a field identifying how packets for the subscriber are to be forwarded in the communications network;

means for receiving, from a policy management process in the communications network, a first policy message that includes rule data that indicates a signaled rule name of the plurality of PFO rule names associated with a particular network address in the communications network, wherein the first policy message includes data formatted according to a Ty interface Specification and includes a PFO rule-name attribute-value pair (AVP), which comprises data indicative of the signaled rule name; and means for processing a data packet of the particular network address according to a particular method associated with a particular rule name that is selected based on the signaled rule name, in response to receiving the first policy message.

19. An apparatus comprising:

means for receiving packet flow optimization (PFO) configuration data that associates each user identifier of a plurality of user identifiers with a corresponding rule name of a plurality of PFO rule names, wherein at least one PFO rule identifies an Internet protocol (IP) address of a subscriber, a quality of service (QOS) policy associated with the subscriber, and a billing policy associated with the subscriber, and wherein the PFO rule includes a field identifying how packets for the subscriber are to be forwarded in a communications network;

means for associating a particular user identifier of the plurality of user identifiers with a particular network address in the communications network; and means for sending, to a policy enforcement process in the communications network, a first policy message that includes, in association with the particular network address, rule data that indicates a signaled rule name associated with the particular user identifier, and wherein the first policy message includes data formatted according to a Ty interface Specification and includes a PFO rule-name attribute-value pair (AVP), which comprises data indicative of the signaled rule name, and wherein the policy enforcement process processes a data packet of the particular network address based on data in a payload of a layer 3 protocol of the data packet according to a particular method associated with a particular rule name that is selected based on the signaled rule name.

20. A system comprising:

a policy manager to:

receive first packet flow optimization (PFO) configuration data that associates each user identifier of a plurality of user identifiers with a corresponding rule name of a plurality of PFO rule names, wherein at least one PFO rule identifies an Internet protocol (IP) address of a subscriber, a quality of service (QOS) policy associated with the subscriber, and a billing policy associated with the subscriber, and wherein the PFO rule includes a field identifying how packets for the subscriber are to be forwarded in a communications network;

associate a particular user identifier of the plurality of user identifiers with a particular network address in the communications network; and send, to a policy enforcement process in the communications network, a first policy message that includes, in association with the particular network address, rule data that indicates a signaled rule name associated with the particular user identifier; and a policy enforcer to:

receive second PFO configuration data that associates each rule name of the plurality of PFO rule names with a corresponding method for processing a data packet in the communications network based on data in a payload of a layer 3 protocol of the data packet, receive, from the policy management process in the communications network, the first policy message, wherein the first policy message includes data formatted according to a Ty interface Specification and includes a PFO rule-name attribute-value pair (AVP), which comprises data indicative of the signaled rule name; and in response to receiving the first policy message, process a data packet for the particular network address according to a particular method associated with a particular rule name that is selected based on the signaled rule name.

21. A system as recited in claim 20, wherein said policy enforcer is further configured to:

determine a particular flow category of the data packet of the particular network address based on data in the payload of the layer 3 protocol of the data packet;

determine in the particular method whether the data packet includes data that matches a trigger condition for requesting further policy data from the policy management process, and if it is determined that the data packet includes data that matches the trigger condition, then send to the policy manager process a PFO policy request message that includes data that indicates the trigger condition.

22. A system as recited in claim 21, wherein:
in response to receiving the PFO policy request message,
　　said policy manager sending a second policy message that includes action data that indicates how to process a data packet in the particular flow category; and
said policy enforcer
　　receiving the second policy message, and
　　processing a data packet in the particular flow category based on the action data.

23. A system as recited in claim 22, wherein the second policy message further comprises:
　　data formatted according to a Ty interface specification of a $3^{rd}$ Generation Partnership Project 22 (3GPP2); and
　　a PFO-action attribute-value pair (AVP) that is added to the Ty interface specification, and that holds the action data.

\* \* \* \* \*